US006792661B1

(12) United States Patent
Fromme et al.

(10) Patent No.: US 6,792,661 B1
(45) Date of Patent: Sep. 21, 2004

(54) DOOR AND FRAME FOR A STORAGE ENCLOSURE AND METHOD OF MAKING SAME

(75) Inventors: Klaus Fromme, Milwaukee, WI (US); David W. Newberry, Marion, OH (US); Mark A. Thielke, Menomonee Falls, WI (US); James R. Heimler, Oak Creek, WI (US); Richard A. Goodare, Franklin, WI (US); Brian J. Boeck, Juneau, WI (US)

(73) Assignee: The Mills Company, Inc., Sandusky, OH (US)

(*) Notice: Subject to any disclaimer, the term of this patent is extended or adjusted under 35 U.S.C. 154(b) by 0 days.

(21) Appl. No.: 10/405,441

(22) Filed: Apr. 2, 2003

Related U.S. Application Data

(62) Division of application No. 10/143,552, filed on May 10, 2002, now Pat. No. 6,685,285.
(60) Provisional application No. 60/290,132, filed on May 10, 2001.

(51) Int. Cl.[7] ........................ B23P 17/00
(52) U.S. Cl. ........................ 29/416; 29/434; 29/558; 83/51
(58) Field of Search ........................ 29/434, 416, 425, 29/557, 558, 897.312, 897.32; 312/326, 199; 409/131; 83/51; 49/506, 399

(56) References Cited

U.S. PATENT DOCUMENTS

| | | | | |
|---|---|---|---|---|
| 359,402 A | | 3/1887 | Paff | |
| 449,936 A | | 4/1891 | Jackson | |
| 498,178 A | | 5/1893 | Leonard | |
| 537,844 A | | 4/1895 | Moore et al. | |
| 669,171 A | | 3/1901 | Jefferis | |
| 726,555 A | | 4/1903 | Durand Meyer | |
| 810,415 A | | 1/1906 | Jefferis | |
| 894,504 A | | 7/1908 | Jefferis | |
| 1,488,375 A | | 3/1924 | Bowers | |
| 1,967,506 A | | 7/1934 | Harrison | |
| 2,144,136 A | | 1/1939 | Albach | |
| 2,195,223 A | | 3/1940 | O'Connor | |
| 2,555,366 A | | 6/1951 | Peters et al. | |
| 2,634,184 A | * | 4/1953 | Carlson | 312/326 |

(List continued on next page.)

FOREIGN PATENT DOCUMENTS

| | | |
|---|---|---|
| EP | 0516 961 | 12/1992 |
| WO | WO 94/15055 | 7/1994 |

OTHER PUBLICATIONS

Brochure—Bradley Corporation, "Lenox Solid Plastic Lockers and Benches" (One Source Central) 4 pgs.
Brochure—Bradley Corporation, Lockers, 4 pgs.

*Primary Examiner*—David P. Bryant
(74) *Attorney, Agent, or Firm*—Foley & Lardner LLP

(57) ABSTRACT

A storage unit providing a storage space and method of forming a door and frame for a storage unit are disclosed. The storage unit comprises a base, a panel movable between an open position and a closed position, and a retaining member. The retaining member is configured for movement between a first position and a second position, the first position being vertically and horizontally offset from the second position. The retaining member engages the base when the panel is in the closed position and the retaining member is in the first position. The method comprises machining a first groove on a first surface of a sheet, and machining a second groove on a second surface opposite the first surface and at least partially offset with the first groove. The door is then rotated so that the first surface of the door is generally in the same plane as the second surface of the frame.

16 Claims, 10 Drawing Sheets

U.S. PATENT DOCUMENTS 3,346,309 A 10/1967 Mellion
3,637,246 A 1/1972 Leiter
3,675,808 A 7/1972 Brink
3,819,246 A 6/1974 List
3,887,101 A 6/1975 Adachi
4,098,424 A 7/1978 Liebscher et al.
4,099,293 A 7/1978 Pittasch
4,226,348 A 10/1980 Dottor et al.
4,391,386 A 7/1983 Moret
4,447,099 A 5/1984 French et al.
4,615,464 A 10/1986 Byrns
4,629,265 A 12/1986 Chester
4,852,920 A 8/1989 DeForrest, Sr.
5,005,881 A 4/1991 Bailey et al.
5,320,239 A 6/1994 Favre
5,360,246 A 11/1994 Leiter
5,372,415 A 12/1994 Tisbo et al.
5,408,748 A * 4/1995 Vermillion et al. .... 29/897.312
5,490,604 A 2/1996 Alexander
D374,486 S * 10/1996 Guin ........................... D25/48
5,573,322 A 11/1996 Wrobel
5,595,426 A 1/1997 Wolff et al.
5,673,984 A 10/1997 Insalaco et al.
5,683,124 A 11/1997 Karpisek
5,802,801 A 9/1998 Hohns et al.
5,951,126 A 9/1999 Wolff et al.
6,053,354 A 4/2000 Niemeyer
6,151,848 A * 11/2000 Hunter .................... 29/897.32
6,357,806 B1 3/2002 Saku
6,408,516 B1 * 6/2002 Taylor ......................... 29/557
6,450,599 B1 9/2002 Mamuyac
6,478,071 B1 11/2002 Workman et al. ........ 160/84.04
2002/0130597 A1 * 9/2002 Newberry et al. .......... 312/199

* cited by examiner

DOOR AND FRAME FOR A STORAGE ENCLOSURE AND METHOD OF MAKING SAME

CROSS-REFERENCE TO RELATED PATENT APPLICATIONS

This is a Divisional Application of U.S. application Ser. No. 10/143,552, filed May 10, 2002, now U.S. Pat. No. 6,685,285, which is in turn claims priority to U.S. Provisional Patent Application No. 60/290,132 titled "Storage Unit" filed May 10, 2001, the full disclosures of which are hereby incorporated herein by reference.

FIELD OF INVENTION

The present invention relates to a latch mechanism for a locker.

BACKGROUND OF THE INVENTION

It is known to provide a storage unit, such as a locker, for use in a workplace, or other institutional, public, government, educational, commercial, or municipal facility such as schools, health clubs, athletic facilities, parks, aquatic centers, military facilities, food processing plants, police departments, recreation centers, theme parks, transportation facilities (e.g., airports, bus stops, train stations, etc.), and the like. Known storage units typically include a plurality of walls, a door, and a latch mechanism, and may be made from plastic, metal, and other materials.

However, known storage units may present disadvantages, such as a large amount of material waste generated during fabrication, a large number of parts to assemble the latch mechanism, restrictive tolerances or undue precision required for assembly and installation of the latch mechanism, cost and time burden in assembly, the costs of skilled labor, inspection and occasional repair or quality control during and after assembly or installation, and other problems that tend to be associated with assembling and installing such known storage units.

Accordingly, it would be advantageous to provide a less costly storage unit that is of a configuration that is relatively easy to assemble and install. It would also be advantageous to provide a storage unit that generates less material waste during fabrication. It would also be advantageous to provide a storage unit that is constructed of fewer components and/or fabricated from fewer parts (e.g., integrally molded or machined).

It would further be advantageous to provide a storage unit with or providing any one or more of these or other advantageous features.

SUMMARY OF THE INVENTION

The present invention relates to a storage unit providing a storage space. The storage unit comprises a base, a panel movable between an open position and a closed position, and a retaining member. The retaining member is configured for movement between a first position and a second position, the first position being vertically and horizontally offset from the second position. The retaining member engages the base when the panel is in the closed position and the retaining member is in the first position.

The present invention also relates to a storage unit providing a storage space. The storage unit comprises a base, a panel coupled to the base and movable between an open and a closed position, and a retaining member configured for diagonal movement between an extended and a retracted position. The retaining member is configured to engage the base when in the extended position to retain the panel in the closed position. The retaining member is configured to disengage the base when in the retracted position so that the panel is movable between the open and closed positions.

The present invention further relates to a method of forming a door and frame for a storage enclosure. The method comprises machining a first groove on a first surface of a sheet, and machining a second groove on a second surface opposite the first surface. The first and second grooves define the door and at least partially separate the door from the frame. The first groove is at least partially offset with the second groove. The door is then preferably rotated so that the first surface of the door is generally in the same plane as the second surface of the frame.

The present invention further relates to various features and combinations of features shown and described in the disclosed embodiments.

DETAILED DESCRIPTION OF PREFERRED AND OTHER EXEMPLARY EMBODIMENTS

Figure 1:
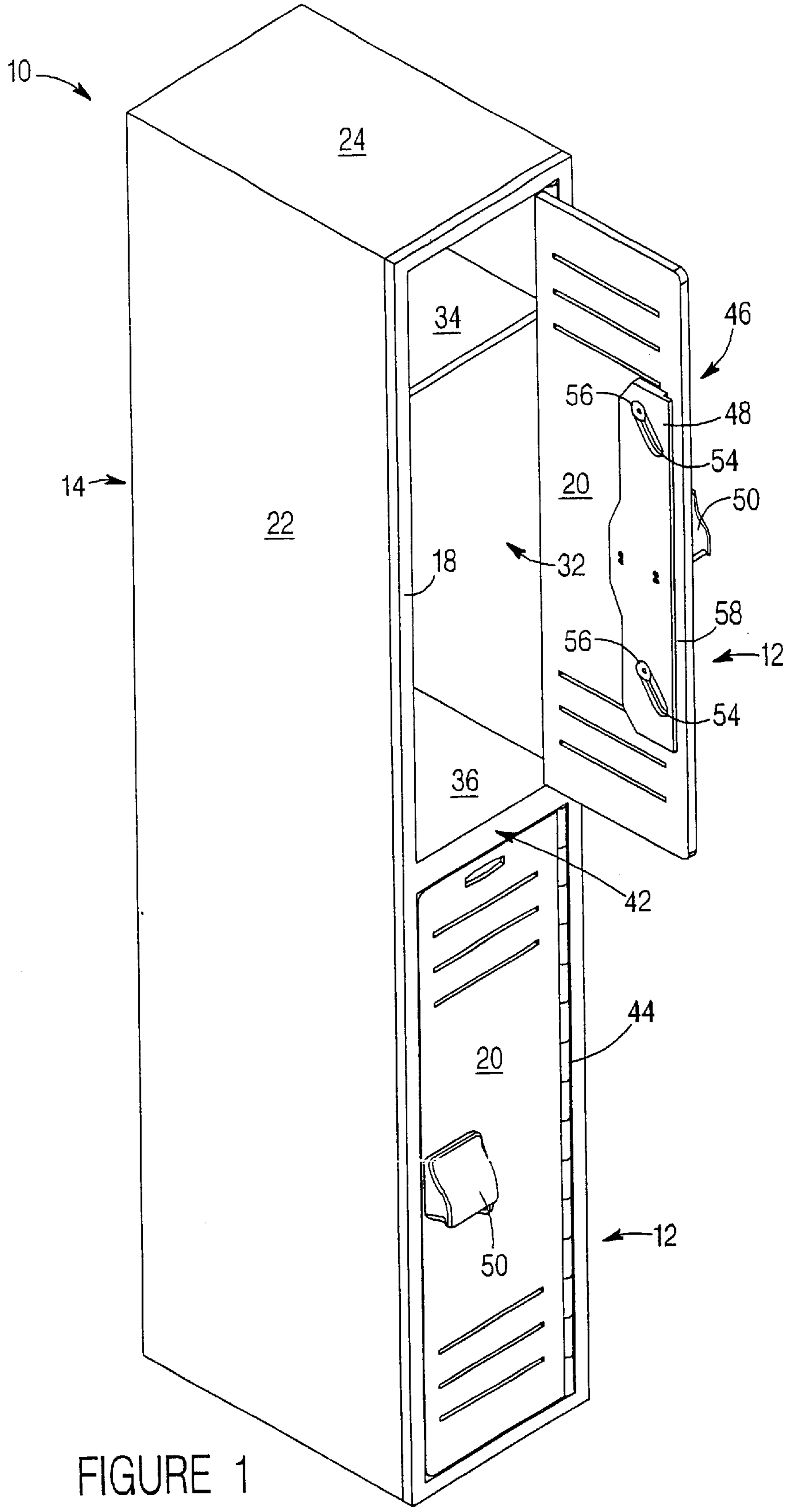
FIG. 1 is a perspective view of a locker system according to a preferred embodiment.
Figure 2:
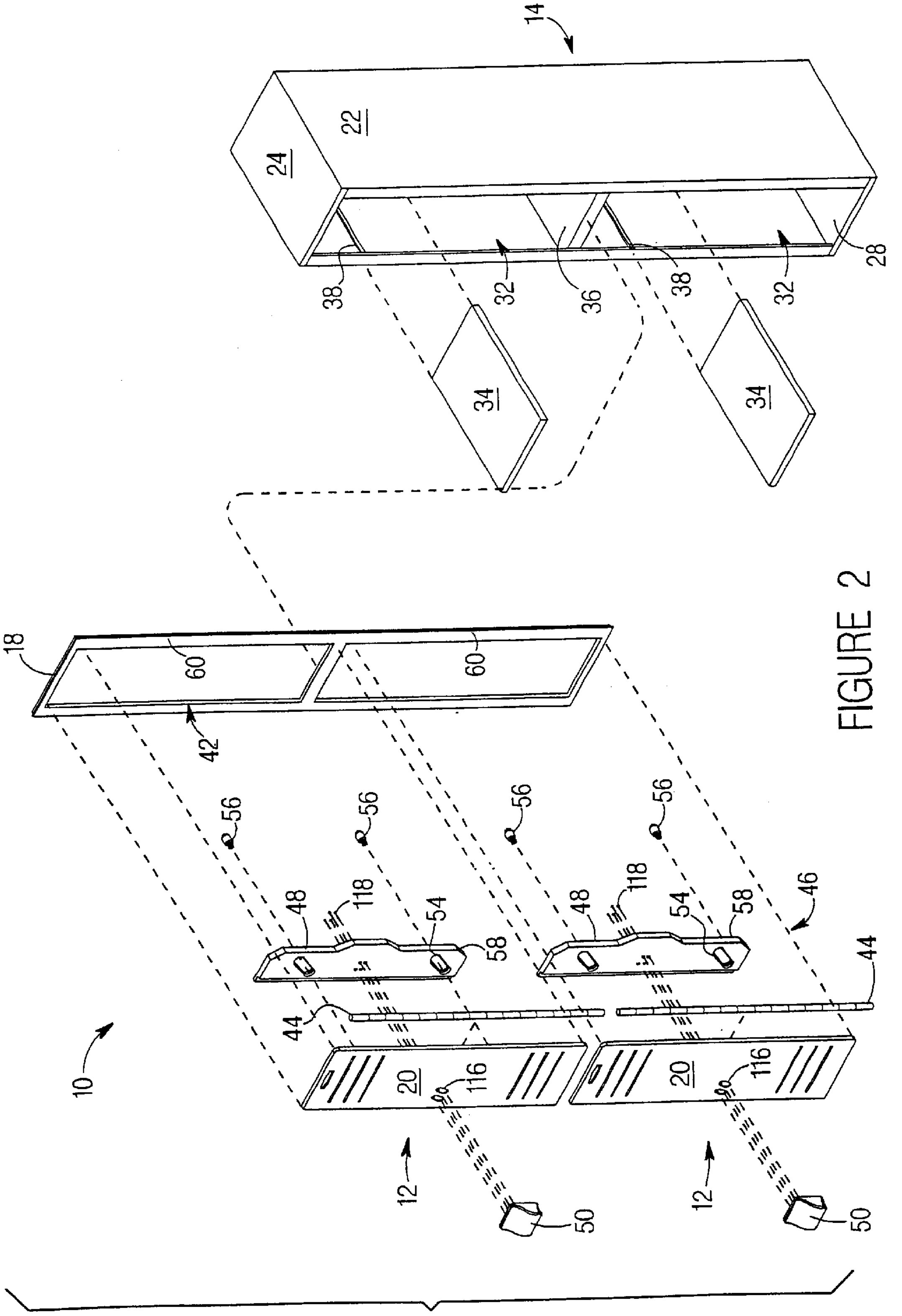
FIG. 2 is an exploded view of the locker system of FIG. 1.

As shown in the FIGS. 1 and 2, a storage unit (shown as a locker system 10 having one or more lockers 12) is configured to provide improved (among other things) manufacturing and assembly, and functionality. Locker 12 includes a base (shown as a box 14 and a frame 18, or one or more oth their components), and a panel (shown as a door 20).

Box 14 includes a plurality of walls (e.g., a pair of side walls 22, a top wall 24, a rear wall, and a bottom wall 28)

and a front member 30 that define an interior storage space 32. According to exemplary embodiments, box 14 may have any of a variety of configurations, shapes, sizes, number of walls, etc. (For example, the box may be made of one or more walls that may provide a rectangular space or a non-rectangular space (e.g., circular, arcuate, ovular, elliptical, cylindrical, etc.). Space 32 may be configured to include one or more shelves 34, hooks, and other accessories or options intended to provide for a variety of storage arrangements. A panel (shown as a divider 36) may be included to provide multiple lockers 12 for a single box 14.

Side walls 22, rear wall, and front members 30 of box 14 may be fabricated using any of a variety of techniques. According to exemplary embodiments, the walls may be secured together using dove tail joints, welding, adhesive, and/or fasteners (e.g., screws, bolts, pins, etc.). According to a preferred embodiment, the walls are formed from a single sheet of material. According to a particularly preferred embodiment, a plastic weld gun is used to secure the walls, shelf and/or divider in place with a plurality of welds. The weld gun may be any of a variety of commercially available weld guns configured to melt adjacent material (e.g., with heat) and/or apply a bonding material (e.g., melted plastic, adhesive, etc.). According to an alternative embodiment, the shelves are secured in place before the box is formed.

Figure 6:
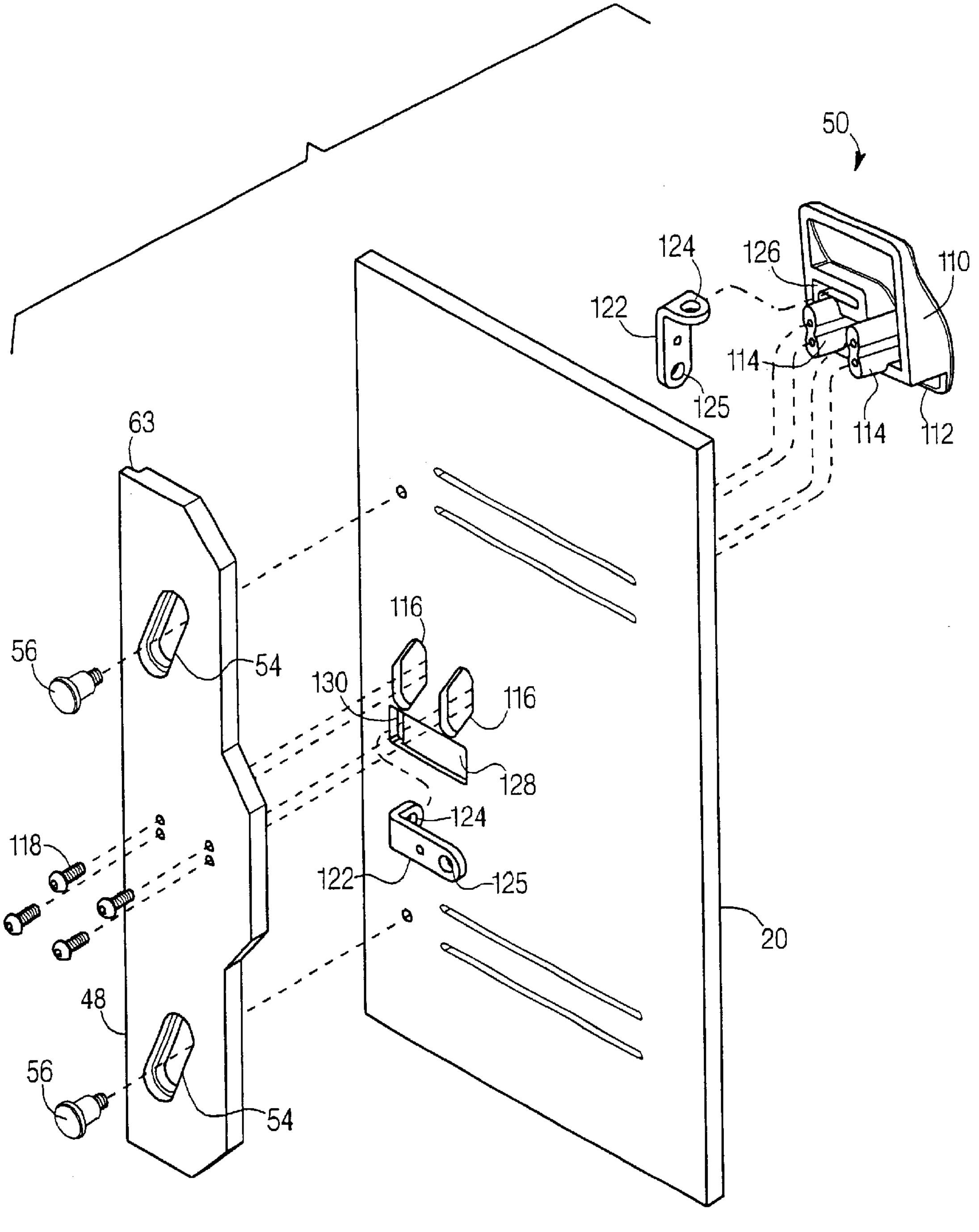
FIG. 6 is an exploded fragmentary perspective view of a handle assembly according to a preferred embodiment.

Referring to FIGS. 2 and 6, frame 18 is secured to front members 30 and is intended to provide a front surface 42 for locker 12. Frame 18 may be attached using any of a variety of techniques (e.g., dove tail joints, fasteners, adhesive, welding etc.). According to a preferred embodiment, frame 18 and box 14 are joined (e.g., welded, fused, bonded, etc.). According to a particularly preferred embodiment, a plastic weld gun is used to secure the frame in place with a plurality of welds on the top and bottom, and near the underside of the divider. According to an alternative embodiment, the frame is attached to the side walls using any of a variety of methods (e.g., mechanical fasteners, etc.).

Figure 3:
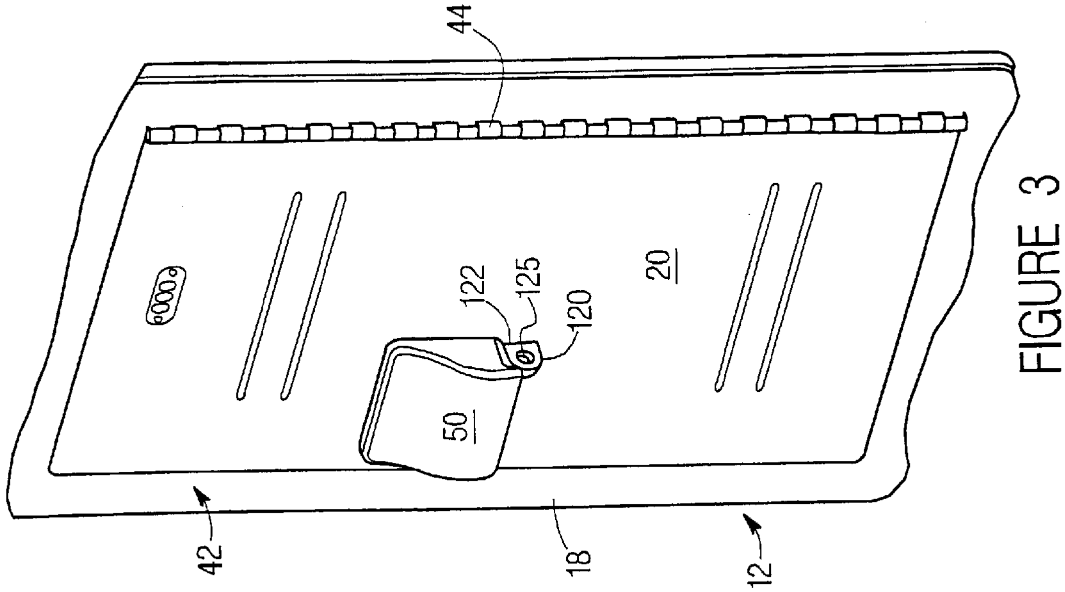
FIG. 3 is a fragmentary perspective view from outside the locker of FIG. 1.
Figure 7:
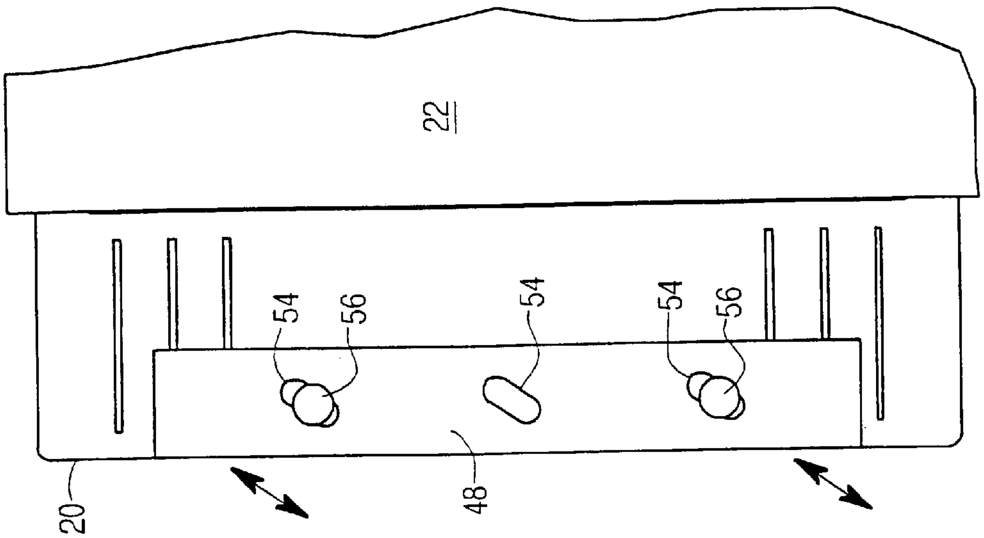
FIG. 7 is a rear view of latch assembly of an open locker door according to an exemplary embodiment.

Referring to FIGS. 1–3, door 20 is attached to frame 18 by one or more hinges 44 and a latch assembly 46. Hinges 44 may be any of a variety of hinge configurations that hingedly couple door 20 to frame 18 (e.g., hinge 44 may be any of a combination of one or more hinges of any type coupling door to box from any side). According to an alternative embodiment, the door is hingedly coupled directly to the side wall 22 or other structure that may support the door.

Latch assembly 46 includes a latch bar (shown as a sliding retaining member 48), a handle 50, and a hasp 120. Retaining member 48 is configured to move between an extended position and a retracted position. In the extended position, retaining member 48 is configured to engage frame 18 to secure door 20 in the closed position. (Preferably, front member 30 is captured or disposed between member 48 and door 20.) In the retracted position, retaining member 48 is configured to disengage from front member 30 so that door 20 may be moved to an open position.

According to a preferred embodiment, retaining member 48 is configured for diagonal movement between the extended position and the retracted position. Retaining member 48 includes one or more slots 54 and is coupled to door 20 by one or more projections 56 (e.g., shoulder bolts, screw or bolt with a nylon bushing, etc.) extending through slots 54. According to a preferred embodiment, retaining member 48 includes recesses around slots 54 to engage or receive a portion of projections 56 and to provide a sliding or bearing surface for the portion of projection 56.

Slots 54 are generally diagonal so that projections 56 guide retaining member 48 in a generally diagonal movement between the extended position (see FIGS. 4 and 5) and the retracted position (see FIG. 1). The weight of retaining member 48 (and attached hardware such as handle 50) and the angle and orientation of slots 54 are intended to urge retaining member 48 in the extended position. According to an exemplary embodiment, slots 54 are angled less than 90°. According to a preferred embodiment, slots 54 are angled between about 20° and about 70°. According to a particularly preferred embodiment, slots 54 are angled approximately 30° from vertical. According to alternative embodiments, the slots may be any of a variety of angles and orientations configured to allow engagement and disengagement of the retaining member and the frame. Additionally, the retaining member may have any number of slot and projection combinations depending on the size and configuration of the door, and desired performance characteristics.

Figure 4:
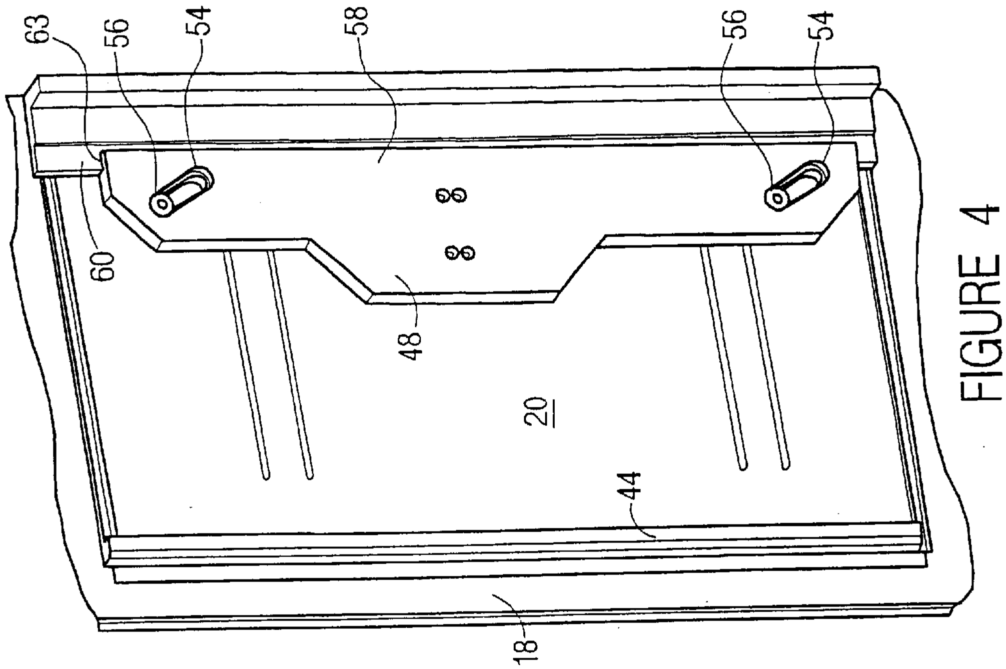
FIG. 4 is a fragmentary perspective view from inside the locker of FIG. 3.
Figure 5:
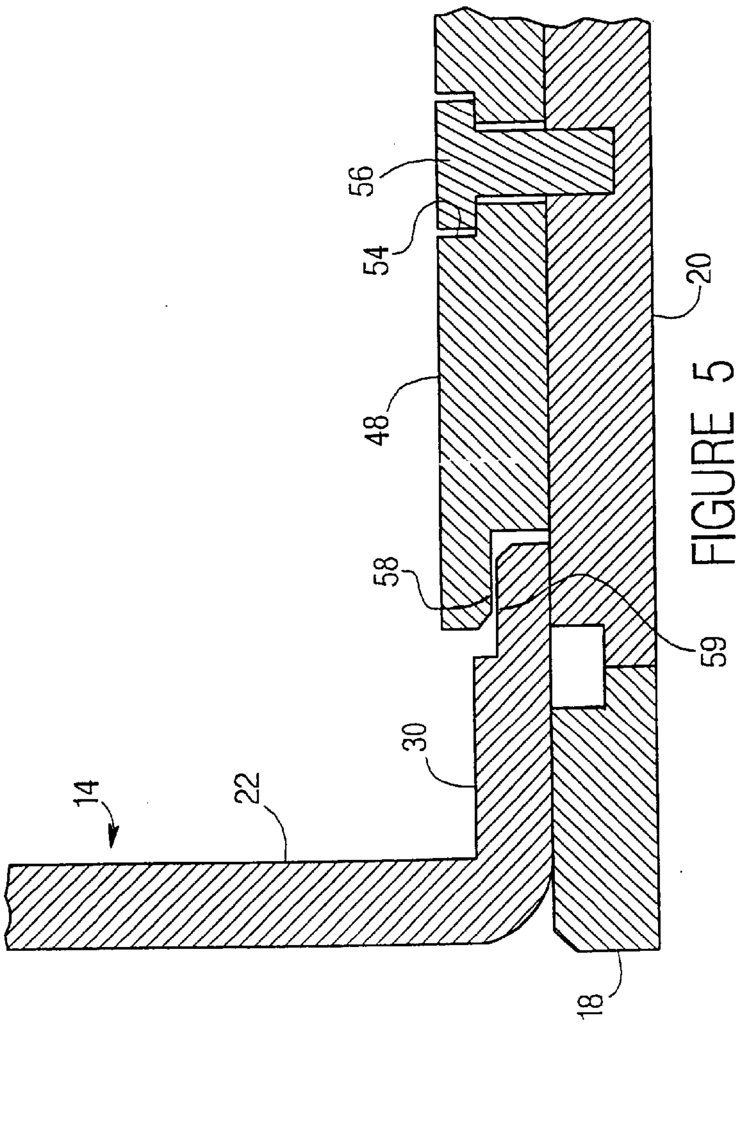
FIG. 5 is a fragmentary section view of a latch assembly for the locker of FIG. 3.

According to a preferred embodiment shown in FIGS. 1, 2, 4, and 5, retaining member 48 includes an interface portion 58 that is configured to engage and disengage an interface portion 59 on front member 30 to secure door 20 in the closed position. As shown in FIG. 5, front member 30 is configured to inhibit door 20 from further rotation into interior space 32 of locker 12. Interface portion 58 and/or 59 may include grooves for improved engagement of retaining member 48 and front member 30.

Figure 8:
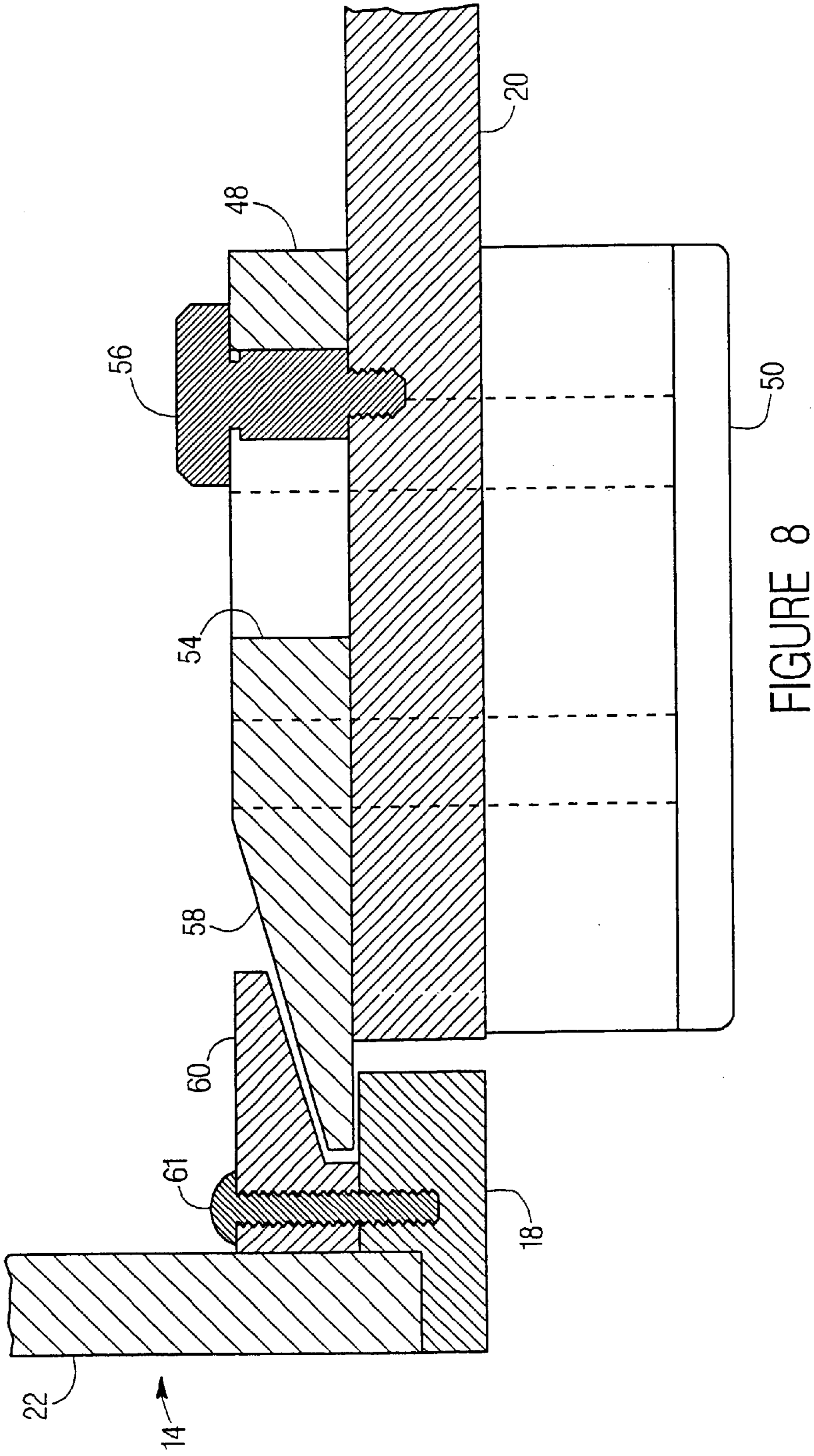
FIG. 8 is a sectional view of the latch assembly of FIG. 6 with the locker door closed.

According to an alternative embodiment shown in FIG. 8, a latch stop 60 is provided as an attached component and configured to couple with retaining member 48 to secure door 20 in the closed position. Latch stop 60 may also be positioned to inhibit door 20 from rotating into interior space 32 of lockers 12. Latch stop 60 may be coupled to frame 18, front members 30, and/or box 14, (e.g., with fasteners 61 (e.g., screw, bolt, pins, etc.), or otherwise secured in place by welding, brazing, heat staking, joining, dovetail slots, adhesive, etc.). Latch stop 60 and frame 18 (or front member 30) define a space configured to receive interface portion 58 to "capture" retaining member 48 when door 20 and latch assembly 46 is secured in a closed position. Latch stop 60 is also configured to inhibit door 20 from rotating into interior space 32 of lockers 12 Latch stop 60 and/or interface portion 58 may have angled surfaces to guide or facilitate engagement.

Referring to FIGS. 4 and 5, retaining member 48 is configured to engage frame 18 and/or front members 30. Alternatively, internal structure such as latch stop 60 may be included to inhibit door 20 from rotating into interior space 32 of lockers 12. According to a preferred embodiment interface position 58 of retaining member 48 includes a flange 63 that defines a groove or notch between interface portion 58 and door 20. (Alternatively, the groove or notch may be between flange 63 and frame 18 or front member 30.) The notch defined by door 20 and flange 63 is configured to receive (e.g., "capture") latch stop 60 when door 20 and latch assembly 46 is secured in the lowered or extended position. Flange 63 may have any of a variety of configurations that are adapted to engage latch stop 60 (e.g., alternating depressions, detents, notches, etc.).

Referring to FIGS. 2 and 6, handle 50 is attached to retaining member 48 through slots 116 so that when handle 50 is raised, retaining member 48 moves in a generally upward direction and away from frame 18 (i.e., between the extended and retracted positions). When handle 50 is released (i.e., when door is in the open or closed position) retaining member 48 is configured to return to the extended position (e.g., due to the weight of handle 50 and retaining member 48, retaining member 48 is biased generally downward due to gravity).

Referring to FIG. 6, handle 50 includes a base portion 110, a grip 112 (shown as a ledge projecting downwardly from base portion 110), and a pair of projections 114 extending from the back of base portion 110. Projections 114 are configured to extend through slots 116 and couple to retaining member 48 (e.g., with fasteners 118, interference fit, etc.). A hasp 120 is coupled to base portion 110 and includes a pair of brackets 122 having apertures 124, 125. According to a preferred embodiment, brackets 122 are "L"-shaped. One of brackets 122 is configured to engage a recess or groove 126 in base portion 110 of handle 50. The other of brackets 122 is configured to reside in a recess 128 in a back surface of door 20 and partially extend through a slot 130 in door 20. As such the aperture 124 on one bracket 122 aligns or registers with aperture 125 on the other bracket 122 when the door 20 is in the closed position and retaining member 48 is in the extended position (e.g., so that a lock can be inserted to lock door 20). To open door 20, the user lifts up on grip 112. Projections 114 slide within diagonal slots 116, and projections 56 slide within slots 54. The angle of slots 116 or slots 54 provide the diagonal (e.g., angular), or horizontal and vertical direction movement of retaining member 48 and handle 50.

According to a preferred embodiment shown in FIGS. 9–12, door 20 and frame 18 are fabricated from a single piece of material by one or more machining operations (e.g., milling, routing, etc.) that remove material from one or both sides of a sheet 62 of material (e.g., plate, blank, etc.). As such, separate sheets of material are not used for a single door and frame assembly, which is intended to reduce waste that would be generated from fabricating frame 18 and discarding material that was the interior or middle portion of the sheet, and would be generated from fabricating door 20 and discarding material that surrounds door 20.

Figure 9:
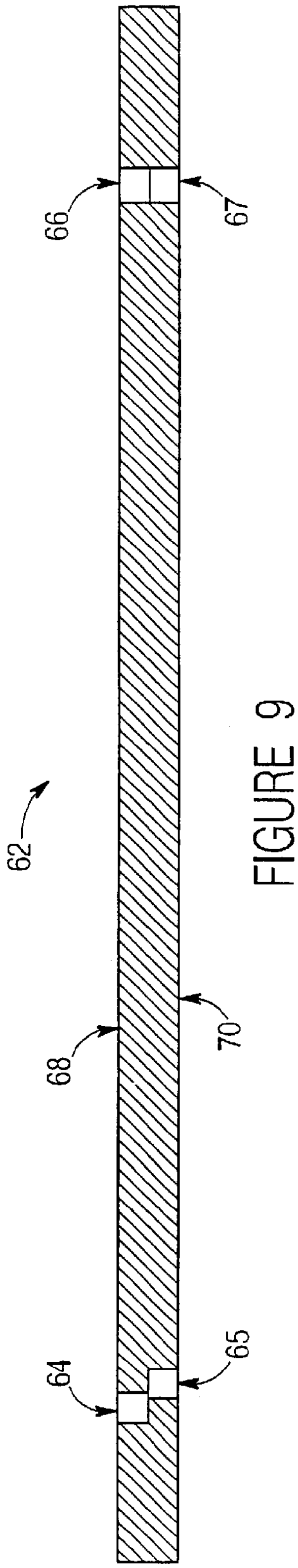
FIG. 9 is a sectional view of a sheet machined to form a door and a frame according to a preferred embodiment.

Referring to FIG. 9, door 20 is formed by grooves 64, 65, 66, 67 that are machined into surfaces 68, 70 of sheet 62. Grooves 64, 66 are located on surface 68 and grooves 65, 67 are located on surface 70 such that groove 64 is partially misaligned with groove 65, and groove 66 is substantially aligned with groove 67 (e.g., offset).

Figure 10:
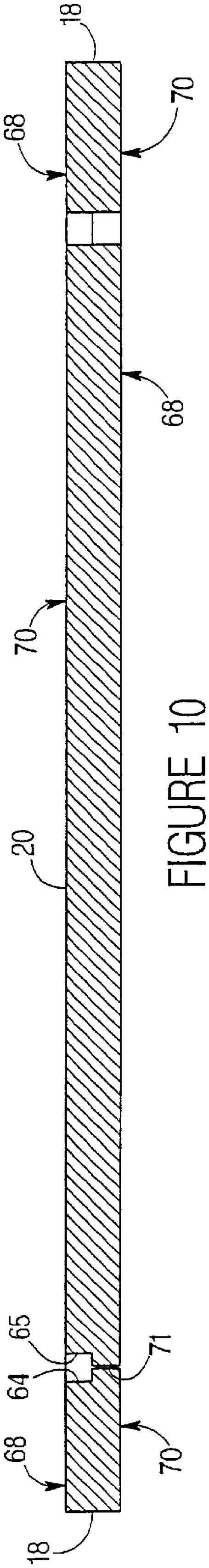
FIG. 10 is a sectional view schematic of the door and frame of FIG. 9 after being aligned for installation.
Figure 12:
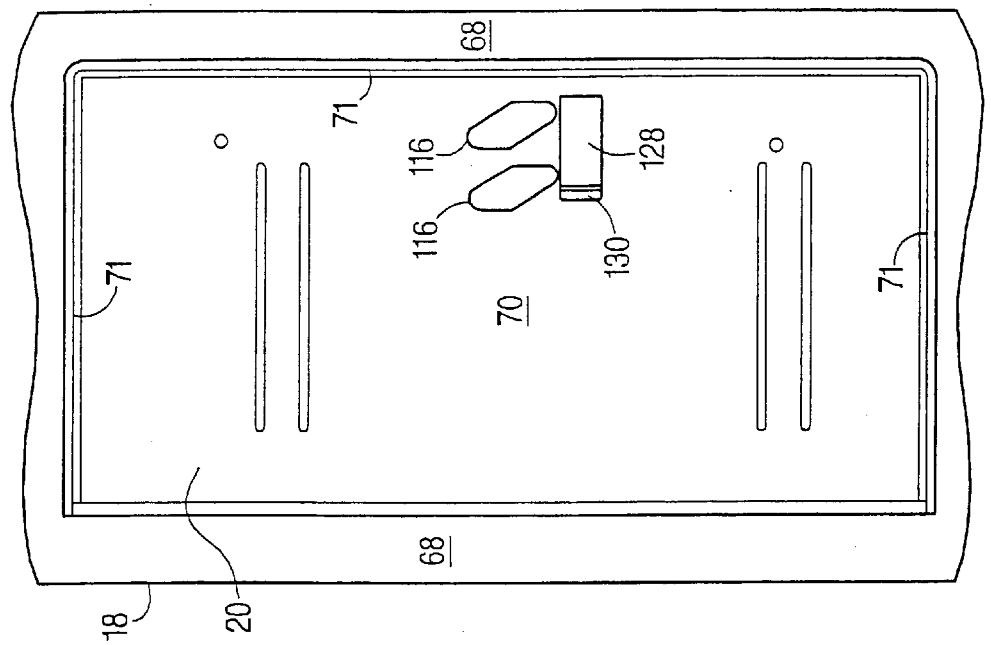
FIG. 12 is an elevation view of the door and frame from inside the locker.
Figure 11:
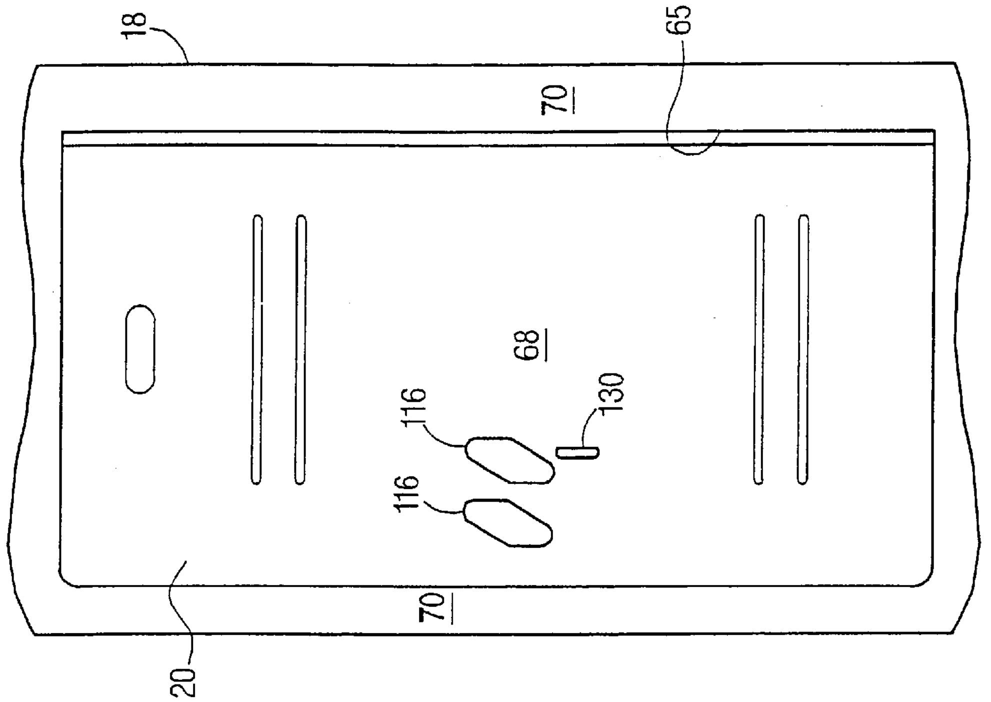
FIG. 11 is an elevation view of the door and frame of FIG. 10 from outside the locker.

Referring to FIG. 10, during assembly of door 20 and frame 18, door 20 is positioned (i.e., reversed and rotated) so that groove 66 remains aligned with groove 67 to provide a clearance slot where hinge 44 is attached, and groove 64 and groove 65 face interior space 32. In the assembled condition, the edges along adjacent grooves 64, 65 are spaced apart a smaller distance (shown as a gap 71) compared to the slot defined by grooves 66, 67. Providing grooves 64, 66 in surface 68, and grooves 65, 67 in surface 70, is intended to allow for use of a standard machining apparatus with a standard tool. The misaligned grooves 64, 65 are intended to allow for a reduced gap between frame 18 and door 20 when door 20 is moved (e.g., rotated and/or shifted) into position.

According to a preferred embodiment, groove 64 and groove 66 overlap between approximately 0.01 inches and 0.02 inches. According to a particularly preferred embodiment, groove 64 and groove 65 overlap approximately 0.016 inches. Alternatively, the grooves overlap more than 1/32 inch. Alternatively, groove 64 and groove 65 overlap between about 1/16 inch and about 1/32 inch. According to alternative embodiments, the grooves may be aligned to provide any of a variety of gaps and/or overlaps between the assembled frame and door according to the desired configuration or performance of the door.

According to an exemplary embodiment, grooves 64, 66 are machined into surfaces 68, 70 with a depth of approximately one-half the thickness of sheet 62. According to a preferred embodiment, grooves 64, 65, 66, 67 have a depth that is more than one-half the thickness of sheet 62. According to a particularly preferred embodiment, grooves 64, 65, 66, 67 have a depth of approximately 0.01 inch greater than one-half the thickness of sheet 62. According to alternate embodiments, the grooves have any of a variety of depths (which may be the same or may be different) that allow for separation of door 20 from frame (e.g., by an additional step).

Figure 13:
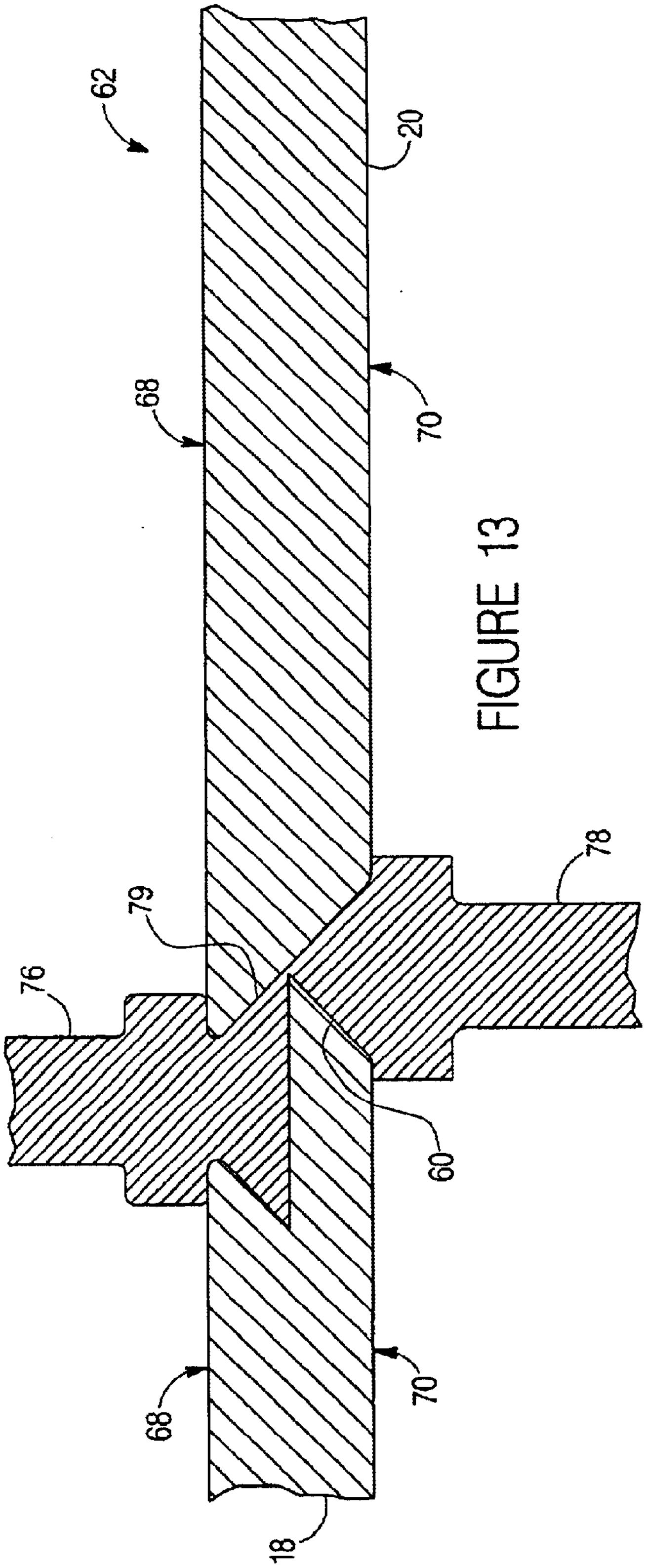
FIG. 13 is a sectional view of a door and frame being machined according to an alternative embodiment.
Figure 14:
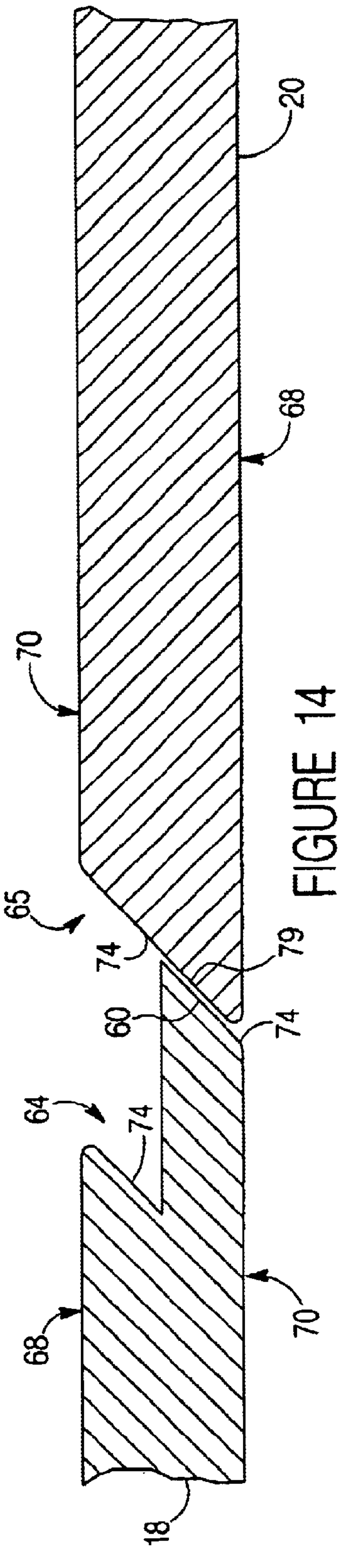
FIG. 14 is a sectional view of the door and frame being machined according to an alternative embodiment.

According to a preferred embodiment, groove 64, 65, 66 and/or 67 have side walls that are generally perpendicular to the surface of sheet 62. According to an alternative embodiment shown in FIGS. 13–15, one or more of the grooves have angled side walls 74 relative to surfaces 68, 70 of sheet 62 (e.g., to provide a dovetail configuration formed by cutting tools 76, 78). As door 20 is positioned (e.g., rotated) during assembly, an interface portion 60 formed by one of angled side walls 74 of frame 18 provides an interference to an interface portion 79 of door 20. According to further alternative embodiments, the grooves may have any of a variety of shapes and configurations according to the desired configuration or performance of the door.

Figure 15:
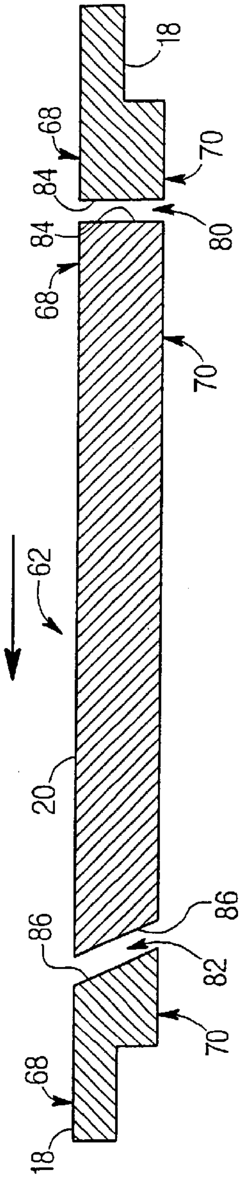
FIGS. 15–18 are sectional views of a door and frame being formed from a single sheet of material before and after being realigned according to alternative embodiments.

According to an alternative embodiment of FIG. 15, door 20 and frame 18 are formed by providing a groove 82 on at least one side of door, and a groove 80 on the other side of door 20. Groove 80 and/or 82 may be formed by one or more operations (e.g., milling, cutting, etc.), depending on whether the grooves are provided on one or both sides of the sheet. Groove 80 includes side walls 84 that are generally perpendicular to surfaces 68, 70 of sheet 62. Groove 82 has side walls 86 that are angled relative to surfaces 68, 70 of sheet. To assemble, door 20 is moved (e.g., shifted) and positioned within frame 18 so that groove 82 becomes smaller and groove 80 becomes larger (wider). Door 20 is shifted about 0.125 inches so that groove 80 opposite groove 82 is about 0.25 inches.

Figure 16:
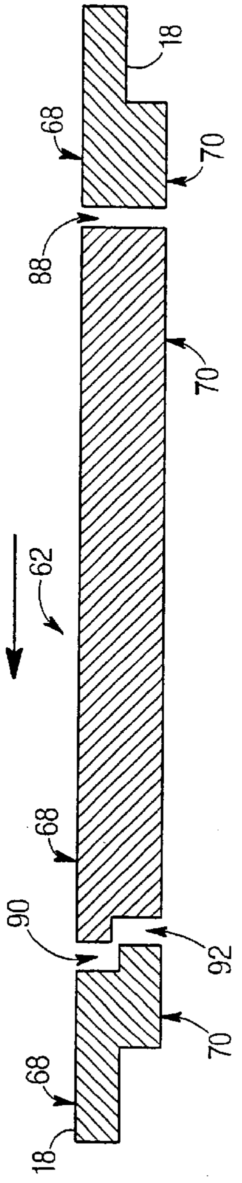

According to an alternative embodiment shown in FIG. 16, door 20 and frame 18 are formed by providing a groove 88 on one or more sides of door 20, and grooves 90, 92 on the other side of door 20. Grooves 88, 90, 92 include side walls 92 that are generally perpendicular to surfaces 68, 70 of sheet 62. Groove 90, 92 are offset to provide an overlap. To assemble, door 20 is moved (e.g., shifted) and positioned within frame 18 so that grooves 90, 92 become smaller and the overlap becomes larger. Door 20 is shifted about 0.125 inches so that groove 88 opposite grooves 90, 92 is about 0.25 inches.

Figure 17:
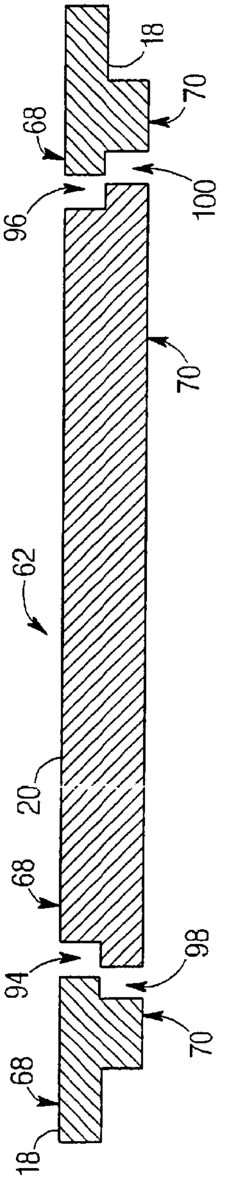
Figure 18:
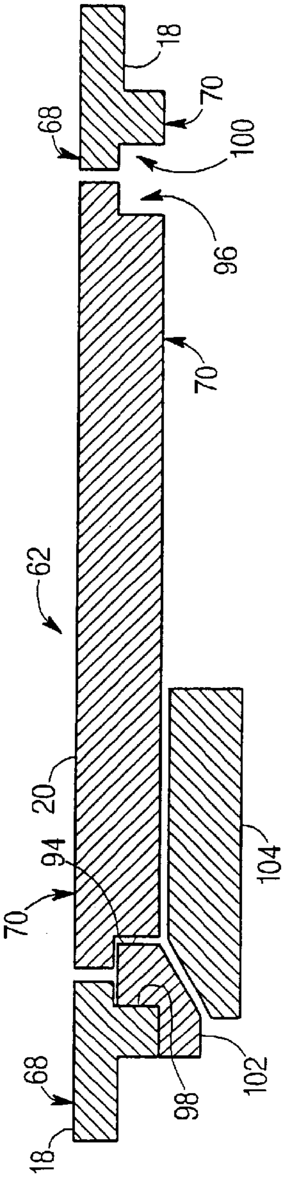

According to an alternative embodiment shown in FIGS. 17 and 18, door 20 and frame 18 are formed by providing grooves 94, 96 on surface 68, and grooves 98, 100 on surface 70 (see FIG. 17). To assemble, door 20 is rotated and positioned within frame 18 so that groove 94 is adjacent 96 and groove 98 is adjacent groove 100 (see FIG. 18). Door 20 opens by rotating about grooves 98, 100 (see arrow in FIG. 18). A latch stop 102 is coupled to frame 18 and retaining member (shown as a latch bar 104) is coupled to door 20 and configured to engage latch stop 102 to secure door 20 in a closed position.

Referring to FIGS. 1 and 2, shelves 34 may be inserted into grooves 38 and held in place by any of a variety of ways (e.g., by frame 18, by an interference fit between shelf 34 and groove 38, adhesive, fasteners, welding, etc. or any combination thereof). According to a preferred embodiment, shelf 34 is located by inserting one side into groove 38 on box 14 at an angle. The other side is pivoted (e.g., slid along the wall) until edges of the shelf is are in the slot in rear wall (e.g., "snaps" into place). After positioning shelf in the desired location (i.e., secured in groove 38 in side walls 22 and back wall), shelf 34 is secured in place (e.g., with welds, adhesives, mechanical fasteners, etc.). According to an exemplary embodiment shown in FIG. 2, divider 36 may be positioned by inserting (e.g., sliding) through a pair of grooves in front members 30 and into a slot in the walls of box 14. An edge of divider 36 remains substantially flush with front side of box 14.

It is important to note that the terms "storage unit," "locker system," and "locker" are intended to be a broad term and not a term of limitation. The latch assembly may be used with any of a variety of storage unit structures and is not intended to be limited to use with lockers.

The lockers may be provided with any of a variety of additional components, including key locks, built in combination locks, coin operated locks, end panels, solid plastic bases, mesh doors, drawers, bins, engraved logos, number plates, hooks, drawers, trim, and the like.

According to a particularly preferred embodiment, the box top wall, bottom wall, frame, and/or door are made from high density polyethylene ("HDPE"). According to an alternative embodiment, any of a variety of plastic materials may be used (e.g., polypropylene, HDPE, polyethylene, acrylonitrile butadiene styrene ("ABS"), nylon, acrylics, any of a variety of homopolymer plastics, copolymer plastics, plastics with special additives, filled or unfilled, reinforced or unreinforced, etc. According to an alternative embodiment, other materials may be used.

According to a preferred embodiment, the retaining member is made from high density polyethylene ("HDPE"). According to an alternative embodiment, the box may be made from any of a variety of plastic materials (e.g., polypropylene, polyethylene, acrylonitrile butadiene styrene ("ABS"), nylon, acrylics, any of a variety of homopolymer plastics, copolymer plastics, plastics with special additives, filled or unfilled, reinforced or unreinforced, etc.) According to an alternative embodiment, the cap may be made from any of a variety of materials.

It is also important to note that the construction and arrangement of the elements of the latch mechanism as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, while the components of the disclosed embodiments will be illustrated as a locker, the features of the disclosed embodiments have a much wider applicability. The latch mechanism is adaptable for other storage units, bins, containers, and other office, home, or educational products which employ a storage space with a door. Further, the size of the various components and the size of the containers can be widely varied. Also, the particular materials used to construct the exemplary embodiments are also illustrative. For example, extruded high density polyethylene is the preferred method and material for making the top and base, but other materials can be used, including other thermoplastic resins such as polypropylene, other polyethylenes, acrylonitrile butadiene styrene ("ABS"), polyurethane nylon, any of a variety of homopolymer plastics, copolymer plastics, plastics with special additives, filled plastics, etc. Also, other molding operations may be used to form these components, such as blow molding, rotational molding, etc. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A method of forming a door and frame for a storage enclosure comprising:

machining a first groove on a first surface of a sheet;

machining a second groove on a second surface of the sheet opposite the first surface;

wherein the first and second grooves at least partially define the door, at least partially define the frame, and at least partially separate the door from the frame;

wherein the first groove is at least partially offset with the second groove.

2. The method of claim 1 further comprising aligning the first surface of the door with the second surface of the frame.

3. The method of claim 1 wherein the door comprises four sides, and the first groove is offset from the second groove along three sides of the door and the first groove is aligned with the second groove along the remaining side of the door.

4. The method of claim 1 wherein the first groove is a dovetail groove.

5. The method of claim 1 wherein the first groove is angled relative to the first surface and the second groove is generally perpendicular to the second surface.

6. The method of claim 1 further comprising rotating the door so that the first surface of the door is generally planar with the second surface of the frame.

7. A method of forming a door and frame for a storage enclosure from a single piece of material, the method comprising:

providing a sheet having a first surface and a second surface opposite the first surface;

machining a first groove on the first surface of the sheet;

machining a second groove on the second surface of the sheet, wherein at least a portion of the second groove is aligned laterally offset from the first groove and wherein the first groove and the second groove at least partially define an outer perimeter of the door, at least partially define an inner perimeter of the frame, and at least partially separate the door from the frame;

rotating the door relative to the frame so that the first surface of the door is generally planar with the second surface of the frame; and coupling the door to the frame.

8. The method of claim 7 wherein the door comprises four sides, and the first groove is offset from the second groove along three sides of the door and the first groove is aligned with the second groove along the remaining side of the door.

9. The method of claim 7 wherein the first groove is a dovetail groove.

10. The method of claim 7 wherein the first groove is angled relative to the first surface and the second groove is generally perpendicular to the second surface.

11. The method of claim 7 wherein the sheet is formed from a polymeric material.

12. A method of forming a door and frame for a storage enclosure from a single sheet of material, the method comprising:

providing a sheet having a first surface and a second surface;

forming a first groove on the first surface of the sheet, the first groove having a first portion and a second portion;

forming a second groove on the second surface of the sheet, the second groove having a first portion and a second portion, wherein at least the first portion of the second groove is aligned laterally offset from the first portion of the first groove so that the first groove and the second groove at least partially define an outer perimeter of the door, at least partially define an inner perimeter of the frame, and at least partially separate the door from the frame;

rotating the door relative to the frame so that the first surface of the door is generally aligned with the second surface of the frame; and coupling the door to the frame.

13. The method of claim 12 wherein the second portion of the first groove is generally aligned with the second portion of the second groove.

14. The method of claim 12 wherein the first groove is a dovetail groove.

15. The method of claim 12 wherein the first groove is angled relative to the first surface and the second groove is generally perpendicular to the second surface.

16. The method of claim 12 wherein the sheet is formed from a polymeric material.

* * * * *